US007350948B2

(12) United States Patent
Nino et al.

(10) Patent No.: US 7,350,948 B2
(45) Date of Patent: Apr. 1, 2008

(54) VEHICLE HEADLAMP

(75) Inventors: Naohi Nino, Shizuoka (JP); Takayuki Iwaki, Shizuoka (JP); Tomoyuki Moritani, Shizuoka (JP); Akinori Matsumoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/646,505

(22) Filed: Dec. 28, 2006

(65) Prior Publication Data

US 2007/0147062 A1 Jun. 28, 2007

(30) Foreign Application Priority Data

Dec. 28, 2005 (JP) ............................. 2005-380434

(51) Int. Cl.
*B60Q 1/00* (2006.01)

(52) U.S. Cl. ....................................... 362/539; 362/517

(58) Field of Classification Search ..................... None
See application file for complete search history.

(56) References Cited

U.S. PATENT DOCUMENTS 4,497,565 A * 2/1985 Rutten ........................ 399/187
7,201,505 B2 * 4/2007 Sugimoto et al. ........... 362/539
2003/0189840 A1 * 10/2003 Matsumoto et al. ........ 362/539
2005/0024889 A1 * 2/2005 Sugimoto ................... 362/539

FOREIGN PATENT DOCUMENTS

JP 2003-297117 A 10/2003

* cited by examiner

*Primary Examiner*—Sharon E. Payne
*Assistant Examiner*—Kristen A Manskar
(74) *Attorney, Agent, or Firm*—Sughrue Mion, PLLC

(57) ABSTRACT

A vehicle headlamp includes a projection lens which is placed on an optical axis extending in a front and rear direction of a vehicle, a light source which is placed behind a rear focal point of the projection lens, a reflector which reflects light emanated directly from the light source in a forward direction and toward the optical axis, and a light-dark boundary forming plate which is placed between the projection lens and the light source. The light-dark boundary forming plate extends rearward and obliquely downward from a vicinity of the rear focal point of the projection lens, and a light-dark boundary forming portion is formed on a front end portion of the light-dark boundary forming plate. The light-dark boundary forming portion shields a part of the light reflected from the reflector and forms a cut-off line of a light distribution pattern.

10 Claims, 10 Drawing Sheets

VEHICLE HEADLAMP

The present invention claims priority from Japanese patent application no. 2005-380434 filed on Dec. 28, 2005, the entire content of which is incorporated herein by reference.

BACKGROUND OF THE INVENTION

1. Field of the Invention

The present invention relates to a projector-type vehicle headlamp. More specifically, the present invention relates to a vehicle headlamp which is configured so as to illuminate an overhead sign.

2. Description of the Related Art

Generally, a projector-type vehicle headlamp has a light source that is placed on an optical axis extending in a front and rear direction of a vehicle, a reflector that reflects light from the light source in a forward direction and toward the optical axis, and a projection lens that is disposed in front of the reflector and through which the light reflected from the reflector is irradiated in a forward direction of the headlamp.

When such a projector-type vehicle headlamp is configured so as to provide a low-beam irradiation, a shade is disposed between the projection lens and the reflector. The shade shields part of the light reflected from the reflector so as to eliminate upward irradiation light, thereby providing a beam irradiation with a low-beam light distribution pattern having a predetermined cut-off line.

In such a projector-type vehicle headlamp, upward irradiation light is almost completely eliminated by the shade, and therefore, an overhead sign disposed above a road surface in front of the vehicle cannot be clearly seen.

In order to ensure light irradiation that illuminates an overhead sign, a rear-face frosted lens has been proposed to be employed as a projection lens. The rear-face frosted lens is a lens having a rear side surface on which a frosting process is performed.

However, the rear-face frosted lens is expensive, thereby leading to a high cost of the vehicle headlamp.

Therefore, there has been proposed a projector-type vehicle headlamp in which irradiation light for illuminating an overhead sign can be obtained at the time of low-beam irradiation without using the expensive rear-face frosted lens (see, e.g., JP-A-2003-297117).

In a vehicle headlamp 10 shown in FIG. 11, a projector-type lamp unit 11 is disposed in a lamp chamber formed by a lamp body and a cover which are not shown.

The lamp unit 11 includes: a projection lens 18 which is placed on an optical axis Ax extending in a front and rear direction of a vehicle; a light source 12*a* which is placed behind a rear focal point F2 of the projection lens 18; a reflector 14 which reflects light emanated directly from the light source 12*a* in the forward direction and toward the optical axis Ax; a shade 20 which is disposed between the light source 12*a* and the projection lens 18; and a light shielding plate 22 which is integrated with the shade 20. The shade 20 shields part of the light reflected from the reflector 14 so as to eliminate upward irradiation light The light source 12*a* is a light emitting part (filament) of a light-source bulb 12. The light-source bulb 12 is a so-called H7 halogen bulb, and is attached to the reflector 14 so as to be coaxial with the optical axis Ax extending in the front and rear direction of the vehicle.

The reflector 14 has a reflecting surface 14*a*. The reflecting surface 14*a* has substantially an ellipsoid spherical shape having a center axis which coincides with the optical axis Ax.

The reflecting surface 14*a* includes a general reflecting area 14*a*A and a lower reflecting area 14*a*B. The general reflecting area 14*a*A is formed in a shape of an ellipsoid. In a vertical cross section including the optical axis Ax, a first focal point F1 of the ellipsoid is set at a position of the light source 12*a*, and a second focal point of the ellipsoid is set at a rear focal point F2 of the projection lens 18. According to such a configuration, the reflecting surface 14*a* reflects light from the light source 12*a* in a forward direction and toward the optical axis Ax such that the light is substantially converged at the rear focal point F2, which is the second focal point of the ellipsoid, in the vertical cross section including the optical axis Ax.

The projection lens 18 is coupled to a front end of the reflector 14 via a holder 16. The holder 16 is formed into a cylindrical shape which extends forward from a front end opening of the reflector 14, and a rear end portion of the holder is screw-fastened to the reflector 14 at several points.

The projection lens 18 is fixedly supported on the front end portion of the holder 16. The projection lens 18 is a plano-convex lens in which a front surface thereof is convex and the rear surface thereof is flat, and is placed such that the rear focal point F2 thereof coincides with the second focal point of the reflecting surface 14*a* of the reflector 14.

According to such a configuration, the projection lens 18 allows the light reflected from the reflecting surface 14*a* of the reflector 14 to pass therethrough so as to be collected toward the optical axis Ax.

The shade 20 is formed from a metal plate. As shown in FIG. 11, an upper edge 20*a* which forms a cut-off line of a low-beam light distribution pattern is vertically disposed so as to pass through the rear focal point (the second focal point of the reflecting surface 14*a*) F2 of the projection lens 18, thereby shielding part of the light reflected from the reflecting surface 14*a* so as to eliminate upward irradiation light from the projection lens 18. Therefore, low-beam irradiation light which irradiates downward with respect to the optical axis Ax is obtained.

As shown in FIG. 12, the shade 20 is positioned and fixed by holding an annular outer circumferential portion 20*e* thereof at a fastening portion between the holder 16 and the reflector 14. On the outer circumferential portion 20*e*, as also shown in FIG. 12, a plurality of screw insertion holes 20*c* through which each screw for fastening the holder 16 to the reflector 14 is inserted, and a positioning pin insertion hole 20*d* into which a positioning pin 14*b* of the reflector 14 is fitted are formed. An optical axis alignment between the shade 20 and the reflector 14 is adjusted by fixing the shade 20 to the reflector 14 together with the holder 16.

As shown in FIGS. 12 and 13, the shade 20 has an opening 20*b* which penetrates through the shade 20 in the vicinity of the upper edge 20*a* in order to form an overhead sign illuminating light. The opening 20*b* is laterally elongated and is substantially in a rectangular shape. The opening 20*b* allows the light reflected from the lower reflecting area 14*a*B of the reflecting surface 14*a* to transmit therethrough, thereby forming the overhead sign illuminating light B.

As shown in FIG. 12, the light shielding plate 22 includes: a main portion 22A which extends rearward and obliquely downward from a portion between the upper edge 20*a* of the shade 20 and the opening 20*b*; and a supporting portion 22B which extends downward along the rear face of the shade 20. The light shielding plate is formed by applying a punching process and a bending process on a metal plate, and is integrated with the shade 20 by spot welding or the like.

The light shielding plate 22 shields the light reflected from the general reflecting area 14*a*A of the reflecting surface 14*a* to be directed toward the opening 20*b* with the main portion 22A, thereby adjusting the amount of light to be irradiated from the opening 20*b* as the overhead sign illuminating light. Therefore, the light flux of the overhead sign illuminating light B is not excessively increased, and glare to a driver of an oncoming vehicle can be prevented from being generated.

As shown in FIG. 11, in a thus configured vehicle headlamp 10, part of the light reflected by the general reflecting area 14*a*A of the reflector 14 to be directed toward the rear focal point F2 is shielded by the shade 20, thereby adjusting the irradiation light to be a low-beam light distribution. As a result, the low-beam light distribution pattern P shown in FIG. 14 is formed.

On the other hand, the light reflected by the lower reflecting area 14*a*B of the reflector 14 to be directed toward the opening 20*b* of the shade 20 transmits through the opening 20*b*, and thereafter, it is irradiated in a forward direction by the projection lens 18 so as to form the overhead sign illuminating light B. Therefore, the light distribution pattern (overhead sign pattern) Pohs for overhead sign illumination is formed as shown in FIG. 14.

Therefore, even without using an expensive rear-face frosted lens, overhead sign illuminating light can be obtained, and the visibility of an overhead sign can be improved. FIG. 14 shows light distribution patterns which are formed by beams that are irradiated forward from the vehicle headlamp 10, on a virtual vertical screen located at a position 25 m in front of the lamp.

The low-beam light distribution pattern P is a low-beam light distribution pattern for left-hand traffic, and has a horizontal cut-off line CL having a level difference on the left and right sides on the upper edge.

The light distribution pattern Pohs is formed so as to extend in the left and right direction which is homothetic to the shape of the opening 20*b* of the shade 20.

However, with the above-described vehicle headlamp 10, as shown in FIG. 14, dark and non light distributed region Q is formed so as to extend in the left and right direction in a strip-like manner between the low-beam light distribution pattern P and the light distribution pattern Pohs. This non light distributed region Q is formed to have a shape that is widely expanded in the vertical direction. Therefore, due to the darkness of the non light distributed region Q being conspicuous, there is a problem that the driver may experience visual discomfort. Further, there is another problem that a regulation of an adequate illuminance in such a region (for example, the European regulation) cannot be observed.

The non light distributed region Q is formed by shielding a light with a strip-like portion 20*f* (see FIG. 13) between the upper edge 20*a* of the shade 20 and the opening 20*b*. Therefore, it is theoretically possible to reduce the vertical width of the non light distributed region Q by bringing the position of the opening 20*b* close to the upper edge 20*a* so as to narrow the width of the strip-like portion 20*f*, thereby making the existence of the non light distributed region Q inconspicuous.

However, when the width of the strip-like portion 20*f* is narrowed, the strength of the upper edge 20*a* is lowered, thereby causing problems such as a distortion of the upper edge 20*a* while the opening 20*b* is formed. Consequently, in practice, the width of the strip-like portion 20*f* cannot be narrowed. Therefore, it has been impossible to eliminate the discomfort produced by the non light distributed region Q, and to adhere to the regulations.

SUMMARY OF THE INVENTION

It is an object of the invention to provide a vehicle headlamp in which visibility of an overhead sign is improved with a lower cost and an adequate illumination is realized in a region between a light distribution pattern for overhead sign illumination and a cut-off line, thereby eliminating visual discomfort caused such region being very dark while also complying with regulations concerning the illuminance of such a region.

According to an exemplary embodiment of the invention, a vehicle headlamp includes: a projection lens which is placed on an optical axis extending in a front and rear direction of a vehicle; a light source which is placed behind a rear focal point of the projection lens; a reflector which reflects light emanated directly from the light source in a forward direction and toward the optical axis; and a light-dark boundary forming plate which is placed between the projection lens and the light source. The light-dark boundary forming plate extends rearward and obliquely downward from a vicinity of the rear focal point of the projection lens, and a light-dark boundary forming portion is formed on a front end portion of the light-dark boundary forming plate. The light-dark boundary forming portion shields a part of the light reflected from the reflector and forms a cut-off line of a light distribution pattern.

DESCRIPTION OF THE EXEMPLARY EMBODIMENTS

Hereinafter, exemplary embodiments of the vehicle headlamp according to the present invention will be described in detail with reference to the drawings.

Figure 1:
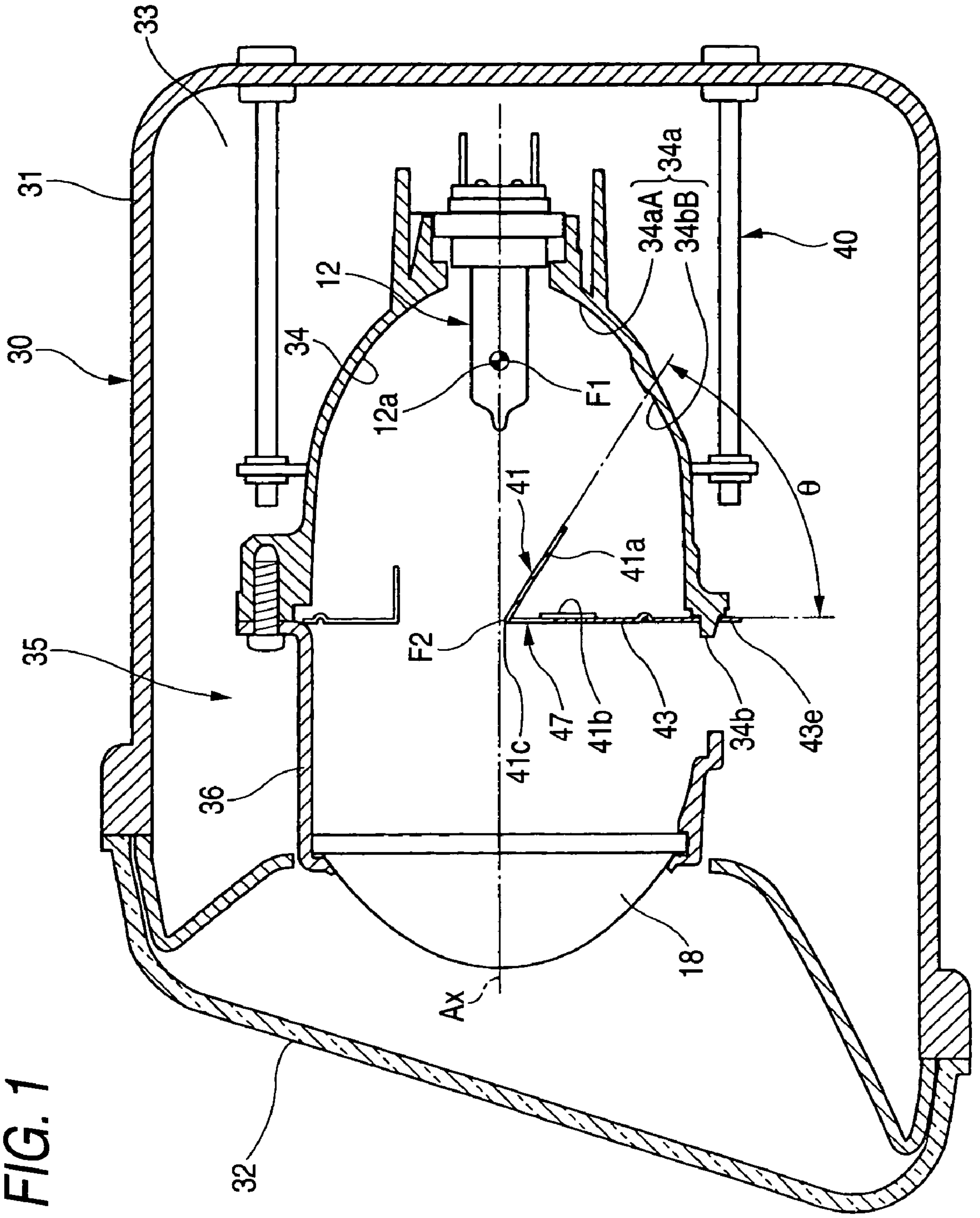
FIG. 1 is a longitudinal sectional view of a vehicle headlamp according to an exemplary embodiment of the invention.

As shown in FIG. 1, a vehicle headlamp 30 according to an exemplary embodiment includes a lamp body 31, a plain transparent cover (cover) 32 attached to the front opening portion of the lamp body 31, and a projector-type lamp unit 35 housed in a lamp chamber 33 which formed by the lamp body 31 and the plain transparent cover (cover) 32.

The lamp unit 35 is supported by the lamp body 31 via an aiming mechanism 40. The aiming mechanism 40 finely adjusts an attaching position and an attaching angle of the lamp unit 35. After the aiming adjustment is performed, a lens center axis (optical axis) Ax of the lamp unit 35 is set to extend in a downward direction of about 0.5 to 0.6 degrees with respect to the front and rear direction of a vehicle.

Figure 2:
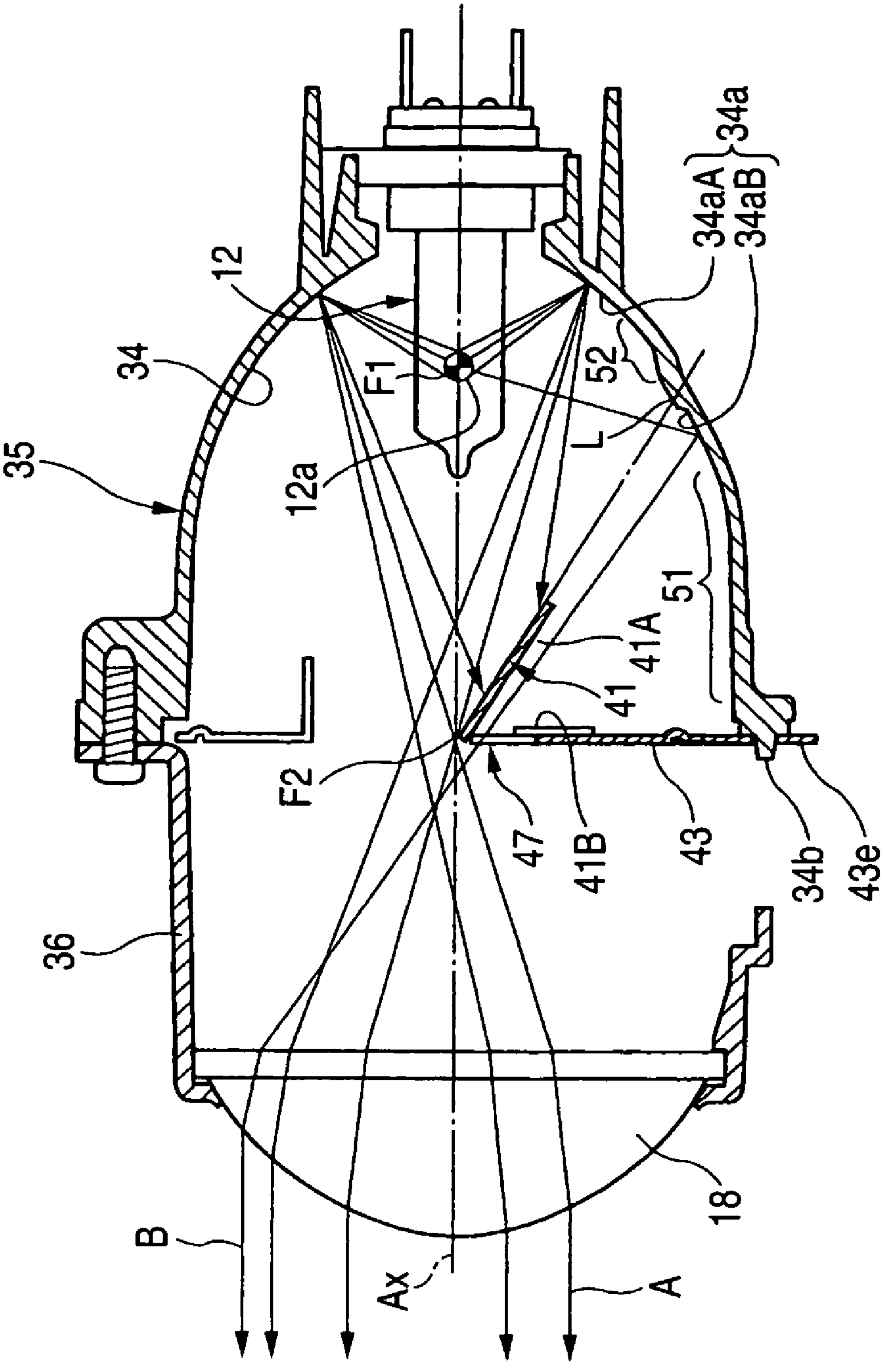
FIG. 2 is a longitudinal sectional view of a lamp unit shown in FIG. 1.

As shown in FIG. 2, the projector-type lamp unit 35 includes: a projection lens 18 which is placed on the optical axis Ax extending in the front and rear direction of the vehicle; a light source 12*a* which is placed behind a rear focal point F2 of the projection lens 18; a reflector 34 which reflects light emanated directly from the light source 12*a* in the forward direction and toward the optical axis; a light-dark boundary forming plate 41 which is placed between the light source 12*a* and the projection lens 18; and a shade 43 which is disposed between the light-dark boundary forming plate 41 and the projection lens 18.

The light source 12*a* is a light emitting part (filament) of a light-source bulb 12. The light-source bulb 12 may be an H7 halogen bulb, and is attached to the reflector 34 such that the center of the light source 12*a* and the center of the reflector are substantially on the optical axis Ax extending in the front and rear direction of the vehicle (more precisely, in a downward direction of about 0.5 to 0.6 degrees with respect to the front and rear direction of the vehicle).

Instead of the halogen bulb, a discharge bulb or the like may be used as the light-source bulb. Further, an LED or the like may be used as the light source.

The reflector 34 has a reflecting surface 34*a*. The reflecting surface 34*a* has substantially an ellipsoid spherical shape having a center axis which coincides with the optical axis Ax.

The reflecting surface 34*a* includes a general reflecting area 34*a*A and a lower reflecting area 34*a*B. The general reflecting area 34*a*A is formed in an ellipsoid shape. In a vertical cross section including the optical axis Ax, a first focal point F1 of the ellipsoid is set at a position of the light source 12*a*, and a second focal point of the ellipsoid is set at a rear focal point F2 of the projection lens 18.

According to such a configuration, the reflecting surface 34*a* reflects light from the light source 12*a* in a forward direction and toward the optical axis Ax such that the light is substantially converged at the rear focal point F2, which is the second focal point of the ellipsoid, in the vertical cross-section including the optical axis Ax.

The projection lens 18 is coupled to a front end of the reflector 34 via a holder 36. The holder 36 is formed into a cylindrical shape which extends forward from a front end opening of the reflector 34, and a rear end portion of the holder is screw-fastened to the reflector 34 at several points.

The projection lens 18 is fixedly supported on the front end portion of the holder 36. The projection lens 18 is a plano-convex lens in which a front surface thereof is convex and the rear surface thereof is flat, and is placed such that the rear focal point F2 thereof coincides with the second focal point of the reflecting surface 34*a* of the reflector 34.

According to such a configuration, the projection lens 18 allows the light reflected from the reflecting surface 34*a* of the reflector 14 to pass therethrough so as to be collected toward the optical axis Ax.

Figure 3:
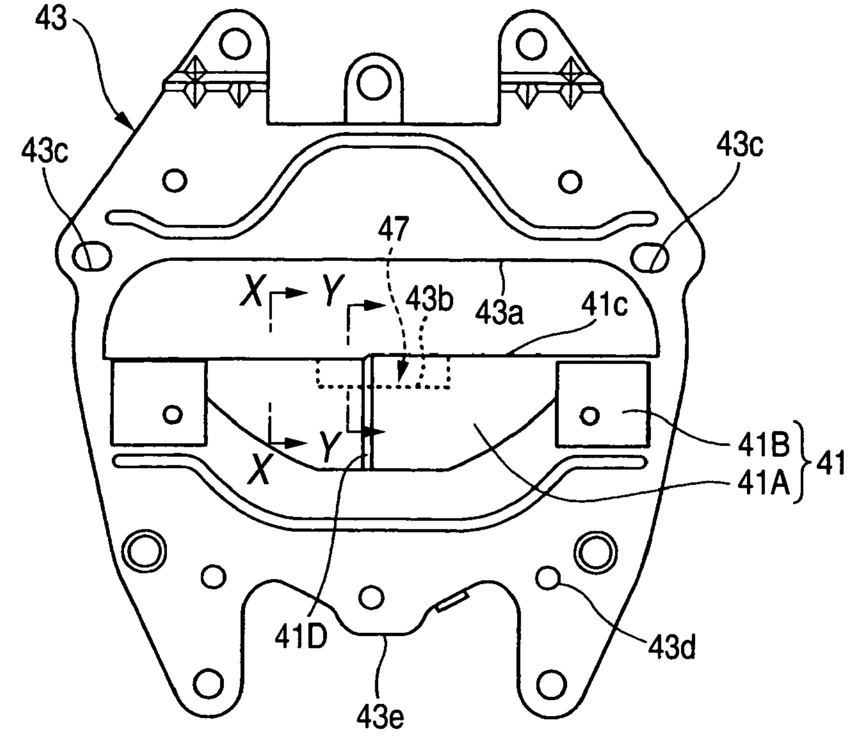
FIG. 3 is a rear view of a shade shown in FIG. 1.
Figure 4:
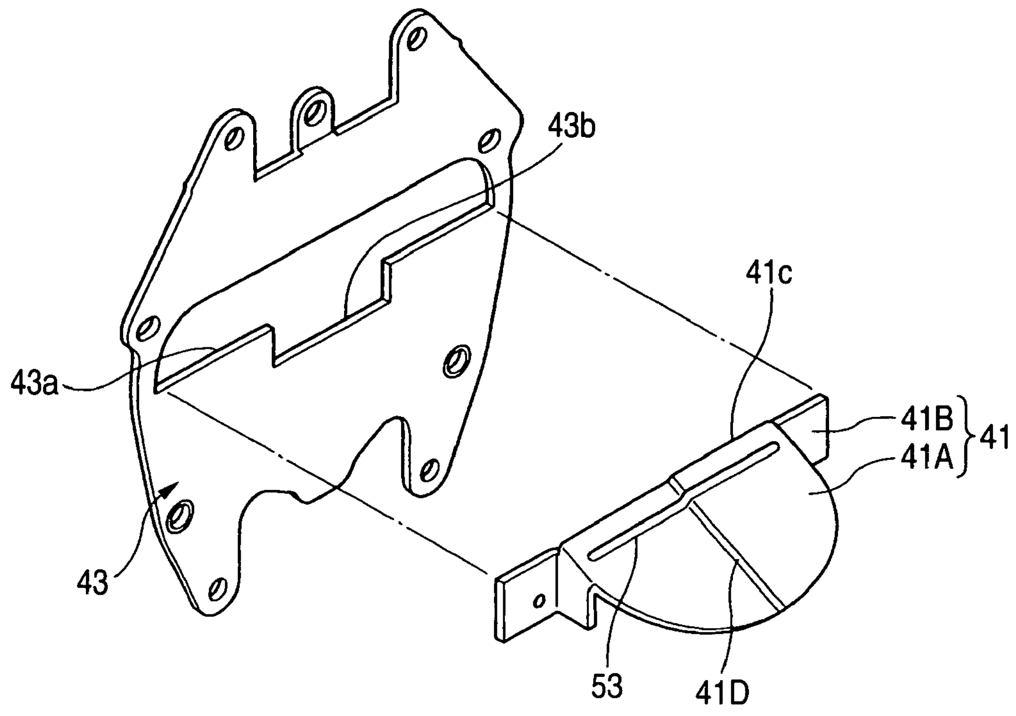
FIG. 4 is an exploded perspective view of the shade and a light-dark boundary forming plate shown in FIG. 3.

As shown in FIGS. 3 and 4, the light-dark boundary forming plate 41 includes: a tongue-like main portion 41A which extends rearward and obliquely downward from the vicinity of the rear focal point F2 of the projection lens 18; and a supporting portion 41B which extends from both sides of an upper end side of the main portion 41A. The light-dark boundary forming plate is formed by applying a punching process and bending process on a metal plate, and is integrated with the shade 43 by spot welding the supporting portion 41B to the back face of the shade 43.

A front end portion of the main portion 41A of the light-dark boundary forming plate 41 is configured as a light-dark boundary forming portion 41C which shields part of the light reflected from the general reflecting area 34*a*A of the reflector 34 and forms a horizontal cut-off line CL (see FIG. 7) of a light distribution pattern. In an exemplary embodiment, the front end portion of the light-dark boundary forming plate 41 which will be formed as the light-dark boundary forming portion 41C has a tapered portion T. The tapered portion T is press-molded such that the thickness thereof gradually decreases (see FIG. 5).

Figure 6:
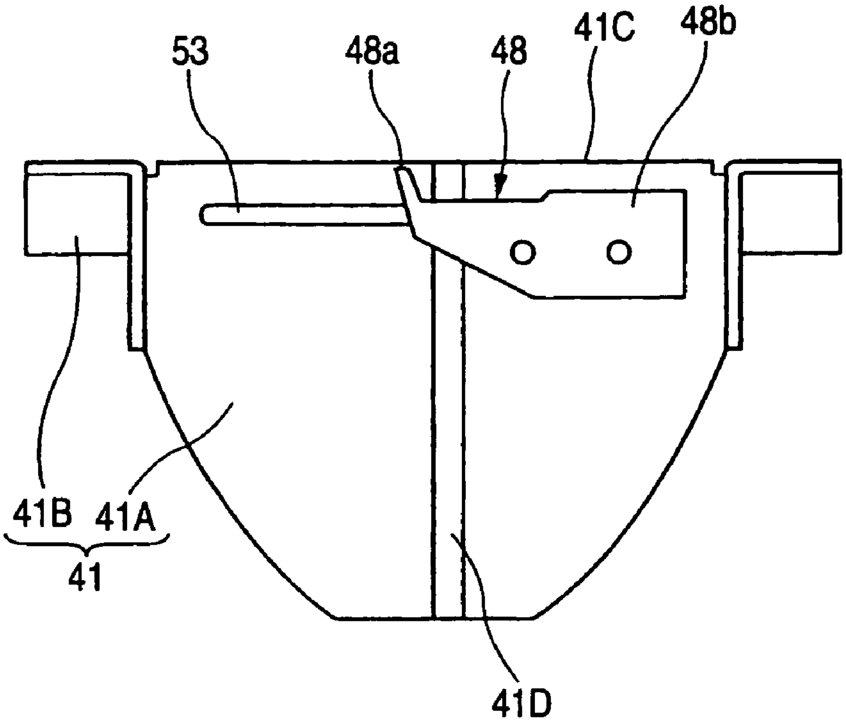
FIG. 6 is a view illustrating a lower face of the light-dark boundary forming plate shown in FIG. 1.

The light-dark boundary forming portion 41C is defined by the sectional shape of the front end portion of the light-dark boundary forming plate 41, and forms the horizontal cut-off line CL which corresponds to the sectional shape of the front end portion of the light-dark boundary forming plate 41. The horizontal cut-off line CL has a level difference on the left and right sides. As shown in FIGS. 4 and 6, an inclined step 41D is formed in a middle area of the main portion 41A in order to form a step CLd (see FIG. 7) of the cut-off line.

According to this configuration, the light-dark boundary forming portion can be formed correctly and easily by, for example, press-molding the light-dark boundary forming plate in the thickness direction.

The shade 43 to which the light-dark boundary forming plate 41 is joined cooperates with the light-dark boundary forming plate 41 to form a low-beam light distribution pattern, and is formed from a metal plate. As shown in FIGS. 2 and 5, the shade 43 is disposed perpendicular to the optical axis Ax such that an upper edge 43*a* thereof is in close proximity beneath the light-dark boundary forming portion 41C.

The shade 43 shields part of the light reflected from the reflecting surface 34*a* so as to eliminate upward irradiation light to be irradiated from the projection lens 18 and to obtain low-beam irradiation light which is irradiated downward with respect to the optical axis Ax.

As shown in FIGS. 1 and 2, the shade 43 is positioned and fixed by holding an outer circumferential portion 43*e* thereof at a fastening portion between the holder 36 and the reflector 34. On the outer circumferential portion 43*e*, as also shown in FIG. 3, a plurality of screw insertion holes 43*c* through which each screw for fastening the holder 36 to the reflector 34 is inserted, and a positioning pin insertion hole 43*d* into which a positioning pin 34*b* of the reflector 34 is fitted are formed. An optical axis alignment between the shade 43 and the reflector 34 is adjusted by fixing the shade 43 to the reflector 34 together with the holder 36.

Figure 13:
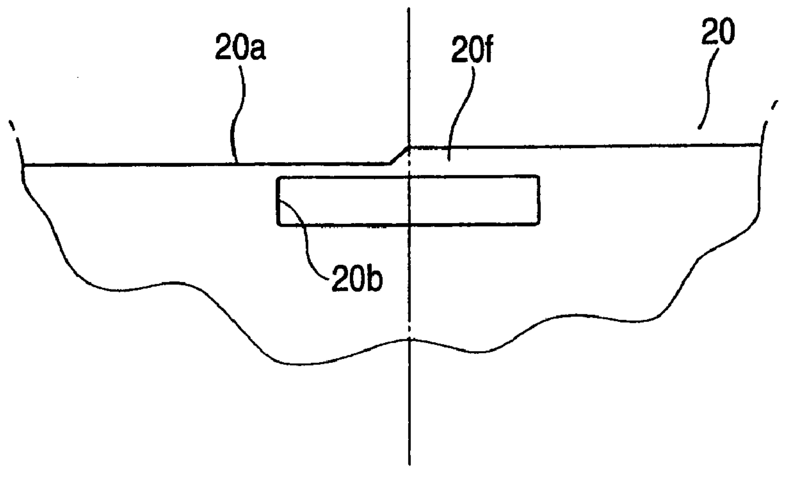
FIG. 13 is an enlarged front view of part of the shade shown in FIG. 11.
Figure 14:
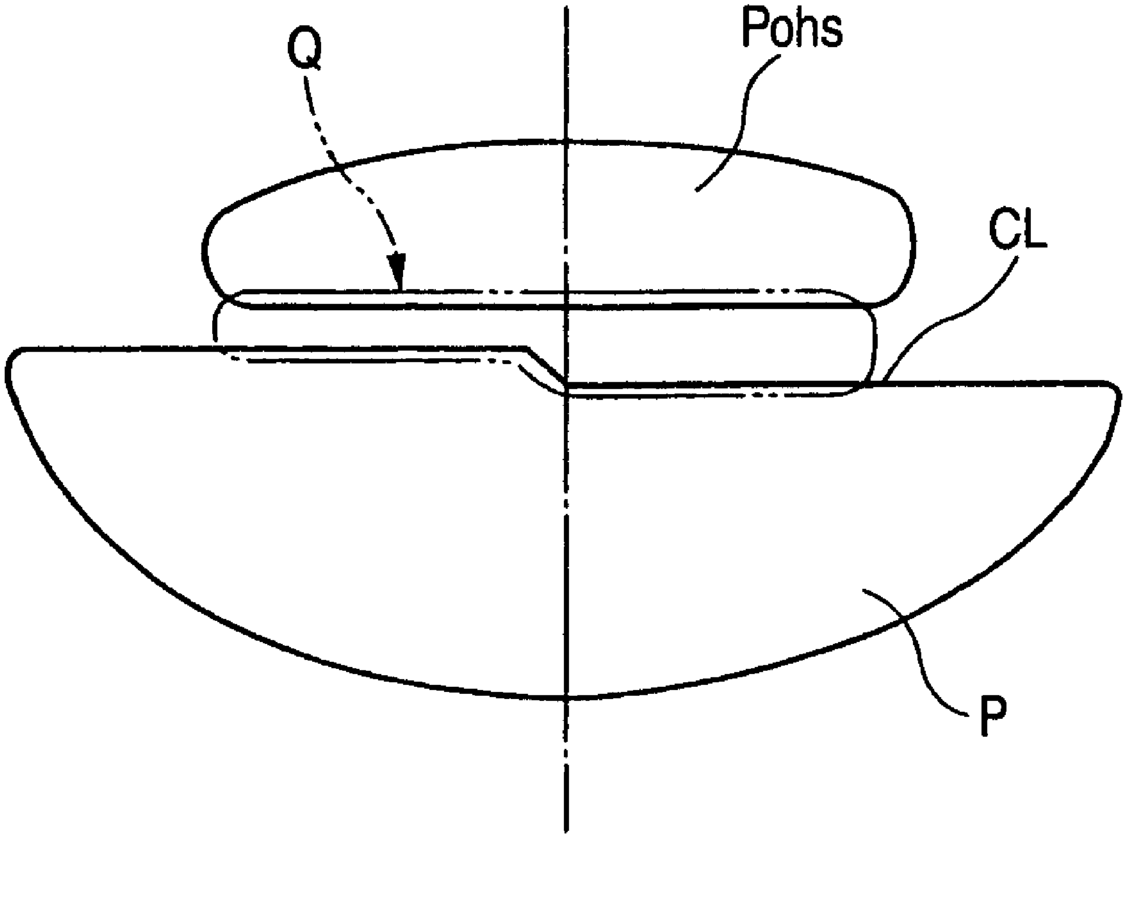
Prior Art FIG. 14
FIG. 14 is a diagram illustrating a light distribution pattern according to the vehicle headlamp shown in FIG. 11.

In an exemplary embodiment as shown in FIG. 4, a light transmitting portion 43*b* is formed by cutting away the middle of the upper edge 43*a* of the shade 43 in a laterally elongated shape which is approximately rectangular, in order to form overhead sign illuminating light. Therefore, as compared with the shade shown in FIG. 13 in which an opening is penetratingly formed so as be slightly separated from the upper edge of the shade, the light transmitting portion can be easily formed. As shown in FIGS. 3 and 5B, an opening 47 is formed by the light transmitting portion 43*b* and the light-dark boundary forming portion 41C which is on the front end portion of the light-dark boundary forming plate 41 and placed on top of the light transmitting portion. The opening 47 allows the light reflected by the lower reflecting area 34*a*B toward the back face of the light-dark boundary forming plate 41 to be transmitted toward the projection lens 18.

Figure 7:
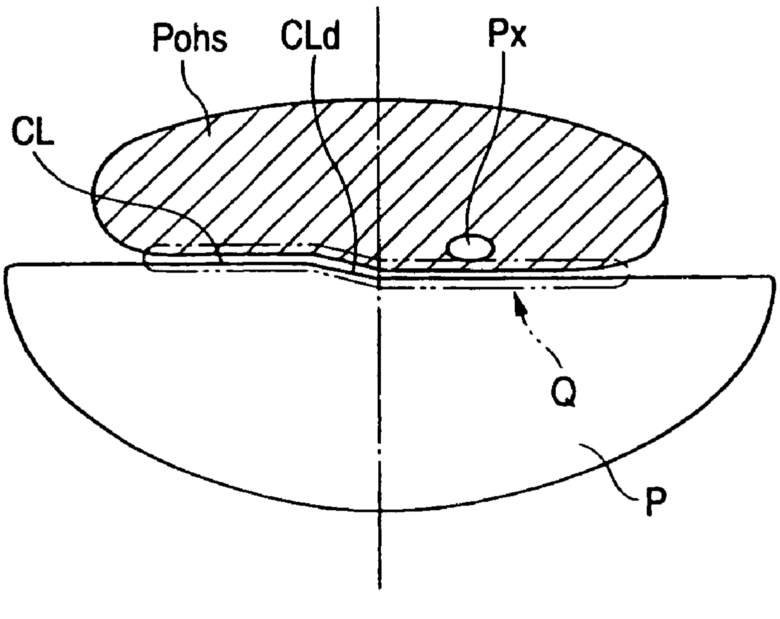
FIG. 7 is a diagram illustrating a light distribution pattern according to the vehicle headlamp shown in FIG. 1.

As shown in FIG. 2, the light transmitted through the opening 47 is then irradiated from the projection lens 18 as an overhead sign illuminating light B which illuminates the upper side of the horizontal cut-off line CL. As shown in FIG. 7, the overhead sign illuminating light B forms a light distribution pattern (overhead sign pattern) Pohs for overhead sign illumination which illuminates the upper side of the horizontal cut-off line CL.

The light-dark boundary forming plate 41 is fixed to the shade 43, and the main portion 41A of the light-dark boundary forming plate 41 shields the light reflected by the general reflecting area 34*a*A of the reflecting surface 34*a* to be directed toward the opening 47, thereby adjusting the amount of light transmitted through the opening 47 as the overhead sign illuminating light B. Therefore, the light flux of the overhead sign illuminating light B is not excessively increased, and glare to a driver of an oncoming vehicle can be prevented from being generated.

In the vehicle headlamp 30 of an exemplary embodiment, as shown in FIG. 6, an auxiliary light shielding portion 48 is disposed in the vicinity of the front end portion of the light-dark boundary forming plate 41 which provides the light-dark boundary forming portion 41C. The auxiliary light shielding portion 48 shields a part of the upwardly directed light that passes below the light-dark boundary forming plate 41 and through the opening 47, in order to adjust the light distribution pattern.

The auxiliary light shielding portion 48 is formed by performing a welding process on a metal plate member of a predetermined shape along the lower face of the main portion 41A. With the inclusion of the auxiliary light shielding portion 48, an adjusted irradiation zone Px where the illuminance is partly lowered is formed in a specific region of the overhead sign pattern Pohs, as shown in FIG. 7. Such a configuration realizes light distribution in a specific region in which illuminance is restricted by a regulation, and performs fine adjustment for different types of vehicle in order to prevent glare to a driver of an oncoming vehicle from occurring.

As shown in FIG. 6, the auxiliary light shielding portion 48 is attached to the light-dark boundary forming plate 41 such that only a tip end portion 48*a* which extends forward from an attaching portion 48*b* interferes with a vertical section including the rear focal point F2 of the projection lens 18. Therefore, as shown in FIG. 7, only a specific portion of the overhead sign pattern Pohs can be darkened as the adjusted irradiation zone Px, and thus, a desired overhead sign pattern Pohs can be easily obtained.

As shown in FIG. 1, the main portion 41A of the light-dark boundary forming plate 41 is set, for example, so as to have an angle θ of about 65.6° with respect to the shade 43 which is disposed perpendicular to the optical axis Ax.

Figure 5A:
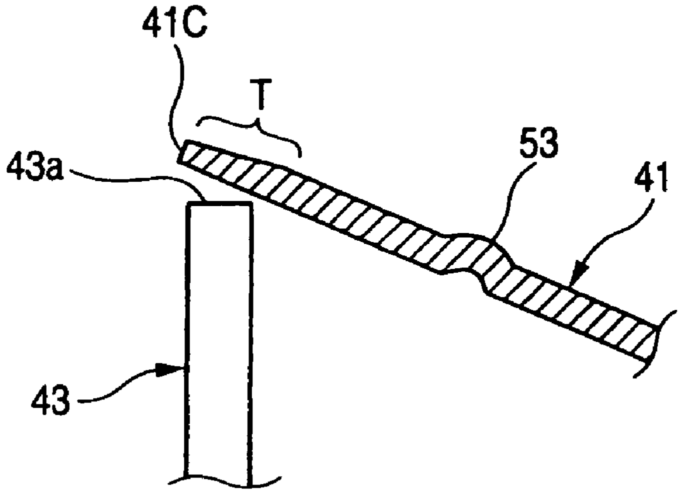
FIG. 5A is a sectional view taken along the line X-X of FIG. 3.
Figure 5B:
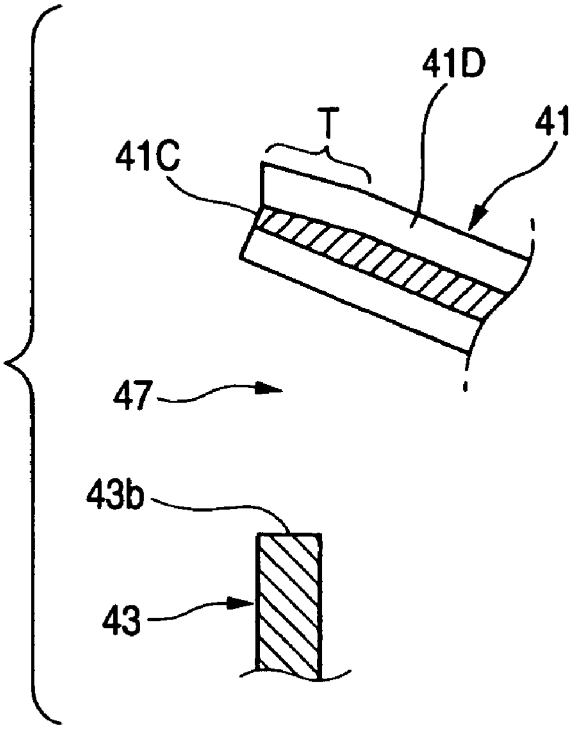
FIG. 5B is a sectional view taken along the line Y-Y of FIG. 3.

According to an exemplary embodiment, as shown in FIGS. 4 to 6, a reinforcing rib 53 is disposed on the upper face of the light-dark boundary forming plate 41 in the vicinity of the front end portion of the main portion 41A and along the light-dark boundary forming portion 41C. As shown in FIG. 5A, the reinforcing rib 53 is a ridge formed by press molding, and improves the strength of the light-dark boundary forming portion 41C of the main portion 41A, without increasing the plate thickness.

As shown in FIG. 2, the reflecting surface 34*a* of the reflector 34 includes the general reflecting area 34*a*A and the lower reflecting area 34*a*B. The boundary between the general reflecting area 34*a*A and the lower reflecting area 34*a*B is set at a position that is slightly above the intersecting point L between the reflecting surface 34*a* and an extended surface of the main portion 41A of the light-dark boundary forming plate 41.

The reference face shape of the lower reflecting area 34*a*B is substantially the same as that of the general reflecting area 34*a*A, but the precise shape of the lower reflecting area is different from that of the general reflecting area 34*a*A.

More specifically, in the lower reflecting area 34*a*B, an area having a predetermined width and which is adjacent to the intersection point L functions as a usual reflecting surface which reflects light emanated directly from the light source 12*a* toward the opening 47. This area is sandwiched between two reflecting areas 51, 52. The two reflecting areas 51, 52 function as side step areas which reflect and diffuse light from the light source 12*a* so as to reduce light directing toward the opening 47.

The diffusive reflection of the light in the reflecting areas 51, 52, and the light shielding of the main portion 41A enable the light irradiated forward through the opening 47, i.e., the overhead sign illuminating light B, to be highly stabilized in directionality and to be adequately adjusted in terms of illuminance.

According to the vehicle headlamp 30 of an exemplary embodiment, as shown in FIG. 2, part of the light reflected by the general reflecting area 34*a*A of the reflector 34 to be directed to the rear focal point F2 is shielded by the light-dark boundary forming plate 41 and the shade 43, thereby adjusting the light as irradiation light A for low-beam light distribution. As a result, a low-beam light distribution pattern P shown in FIG. 7 is formed.

On the other hand, the light reflected toward the opening 47 by the lower reflecting area 34*a*B of the reflector 34 passes through the opening 47, and thereafter, irradiated forward by the projection lens 18 as the overhead sign illuminating light B. As a result, the light distribution pattern (overhead sign pattern) Pohs for overhead sign illumination shown in FIG. 7 is formed.

Namely, without using an expensive rear-face frosted lens, the overhead sign illuminating light B can be obtained, and the visibility of an overhead sign can be improved.

FIG. 7 shows light distribution patterns which are formed by beams that are irradiated forward from the vehicle headlamp 30, on a virtual vertical screen located 25 m in front of the headlamp. The low-beam light distribution pattern P is a low-beam light distribution pattern for left-hand traffic, and has the horizontal cut-off line CL having a level difference on the left and right sides on the upper edge.

The light distribution pattern Pohs for overhead sign illumination is formed into a laterally extending shape which is homothetic to the shape of the opening 47 that is defined and formed by the light transmitting portion 43*b* of the shade 43 and the light-dark boundary forming portion 41C of the light-dark boundary forming plate 41.

According to the vehicle headlamp 30 of an exemplary embodiment, the cut-off line CL of the low-beam light distribution pattern P is formed by the light-dark boundary forming portion 41C formed in the front end portion of the planar light-dark boundary forming plate 41 which extends rearward and obliquely downward from the vicinity of the rear focal point F2 of the projection lens 18.

The light passing above the light-dark boundary forming plate 41 (irradiation light A for low-beam distribution), and the light passing under the light-dark boundary forming plate 41 (overhead sign illuminating light B) are separated from each other only by the thickness of the plate. Therefore, as shown in FIG. 7, the light distribution pattern that is formed by the beams irradiated forward from the vehicle headlamp 30 does not have a dark region between the cut-off line CL and the light distribution pattern Pohs for overhead sign illumination, so that a light distribution pattern which is free from visual discomfort can be obtained.

As a result, visibility of an overhead sign can be improved with a low cost, and an adequate illumination is realized in the region between the cut-off line CL and the light distribution pattern Pohs for overhead sign illumination, thereby eliminating visual discomfort caused by such a region being darkened. Further, regulations concerning the illuminance of such a region can be observed.

According to the vehicle headlamp 30 of an exemplary embodiment, when the position of the tip end portion 48*a* of the auxiliary light shielding portion 48 which is placed in the vicinity of the front end portion of the light-dark boundary forming plate 41 is adequately selected, as shown in FIG. 7, the adjusted irradiation zone Px where the illuminance is partly lowered can be formed in a specific region of the light distribution pattern Pohs for overhead sign illumination. Therefore, a partial change of the light distribution pattern Pohs for overhead sign illumination can be easily made so as to flexibly correspond with various regulations in which different restrictions are imposed on partial illuminance. Further, in order to prevent glare to a driver of an oncoming vehicle from occurring, fine adjustment can be performed for each type of vehicle.

According to the vehicle headlamp 30 of an exemplary embodiment, as shown in FIG. 5A and FIG. 5B, the formation of the tapered portion T allows a dark portion formed above the cut-off line CL to be narrowed by a degree corresponding to the reduction of the thickness of the front end portion of the light-dark boundary forming plate 41.

Therefore, as shown in FIG. 7, the width of the non light distributed region Q formed in the region between the light distribution pattern Pohs for overhead sign illumination and the low-beam light distribution pattern P can be reduced, and it is possible to further reduce the occurrence of visual discomfort caused by the existence of the dark portion.

The projection lens, the light source, the reflector, the light-dark boundary forming plate, the shade, the auxiliary light shielding portion, and the like are not restricted to those as described above by example. It is obvious that various modes can be taken on the basis of the spirit of the invention.

For example, the auxiliary light shielding portion which forms the adjusted irradiation zone where the illuminance is partly lowered in a specific region of the overhead sign pattern Pohs for overhead sign illumination is not restricted to the configuration of the auxiliary light shielding portion 48 that is disposed on the lower face of the light-dark boundary forming plate 41.

Figure 8:
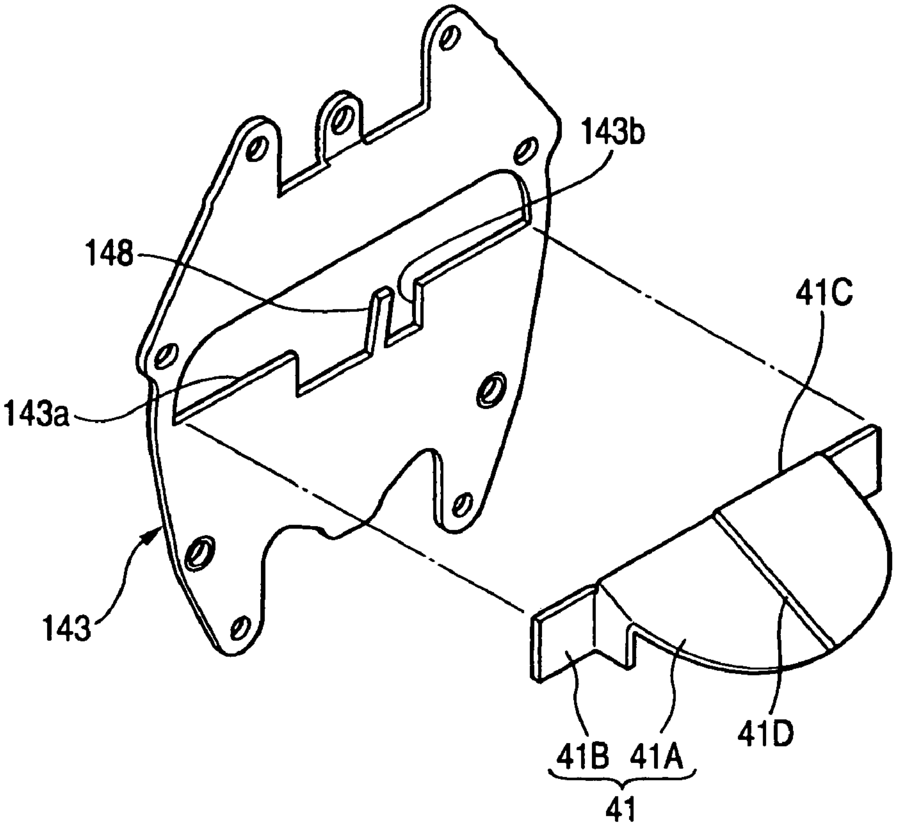
FIG. 8 is an exploded perspective view of a shade and the light-dark boundary forming plate according to another exemplary embodiment of the invention.
Figure 9:
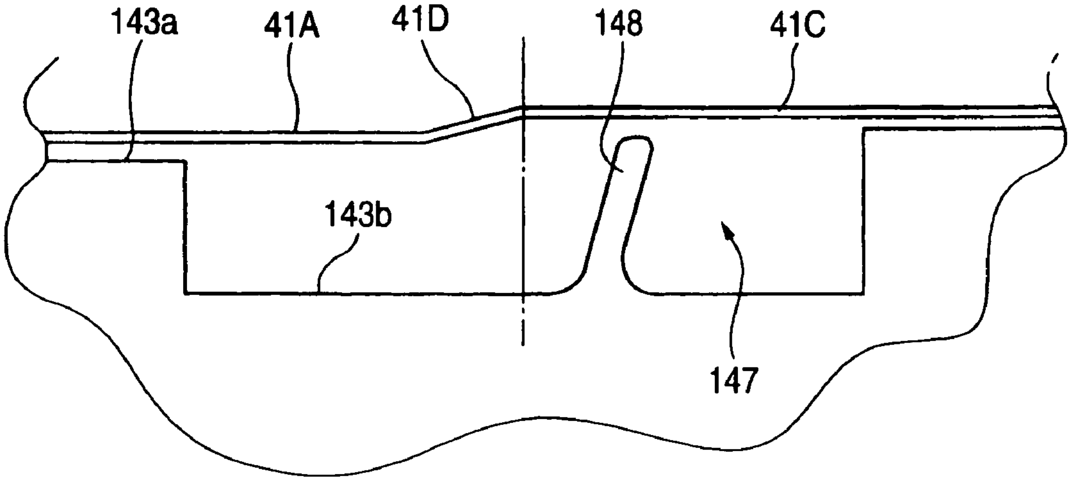
FIG. 9 is an enlarged front view of part of the shade and the light-dark boundary forming plate shown in FIG. 8.

As shown in FIGS. 8 and 9, for example, an auxiliary light shielding portion 148 which adjusts a light distribution pattern by shielding part of upwardly projected light that passes through an opening 147 may be disposed integrally with a light transmitting portion 143*b* formed in an upper edge 143*a* of a shade 143.

Figure 10:
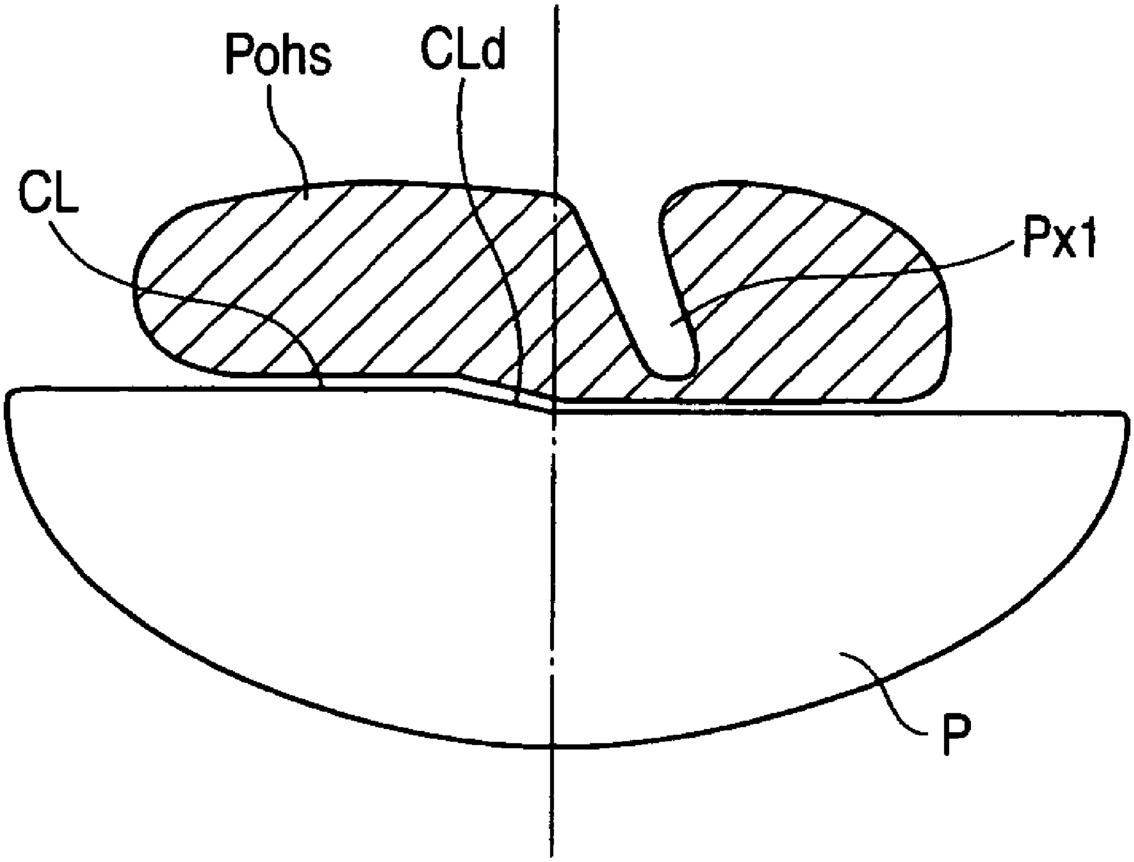
FIG. 10 is a diagram illustrating a light distribution pattern according to a vehicle headlamp using the shade and the light-dark boundary forming plate shown in FIG. 8.
Figure 11:
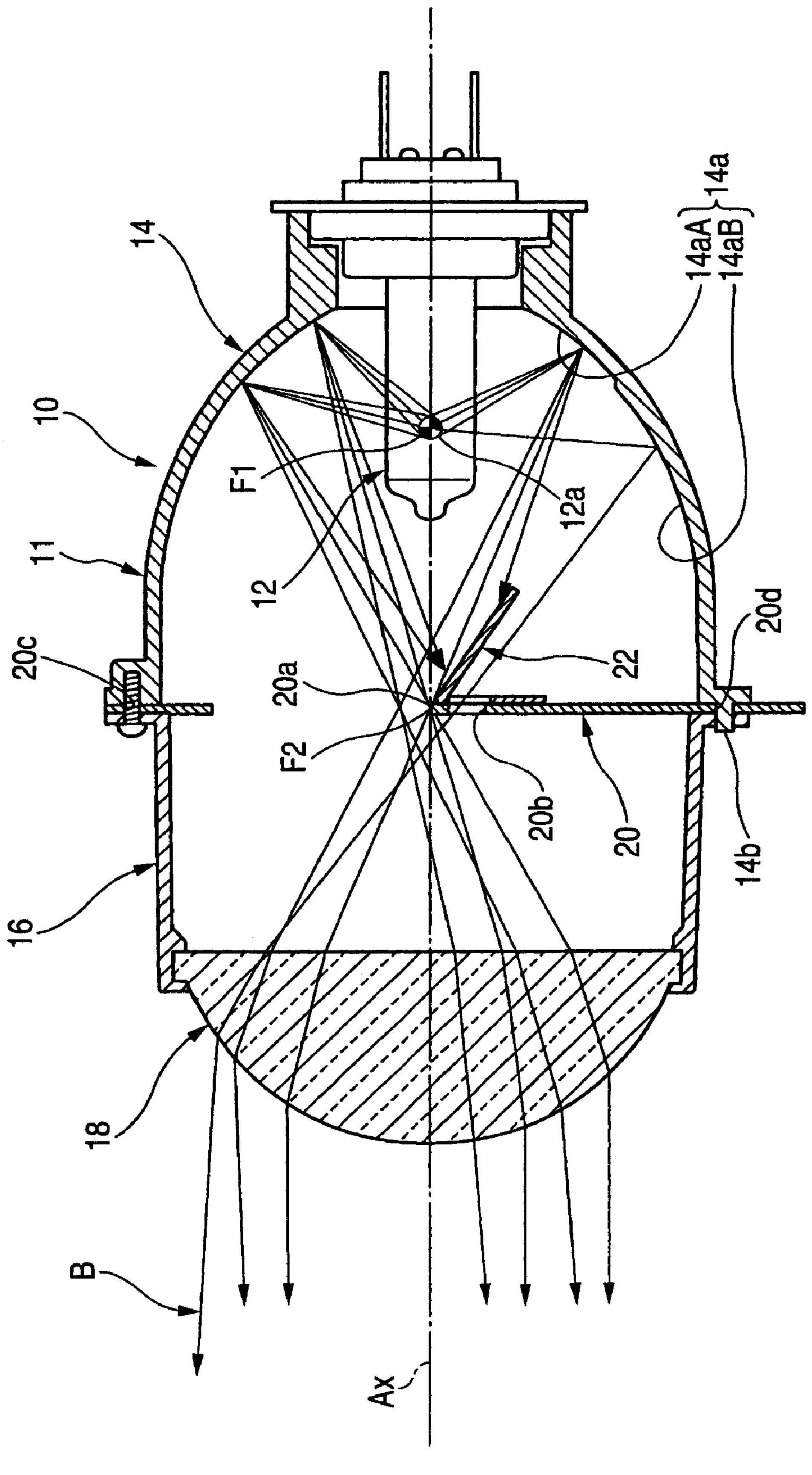
FIG. 11 is a longitudinal sectional view of part of a vehicle headlamp according to a related art.
Figure 12:
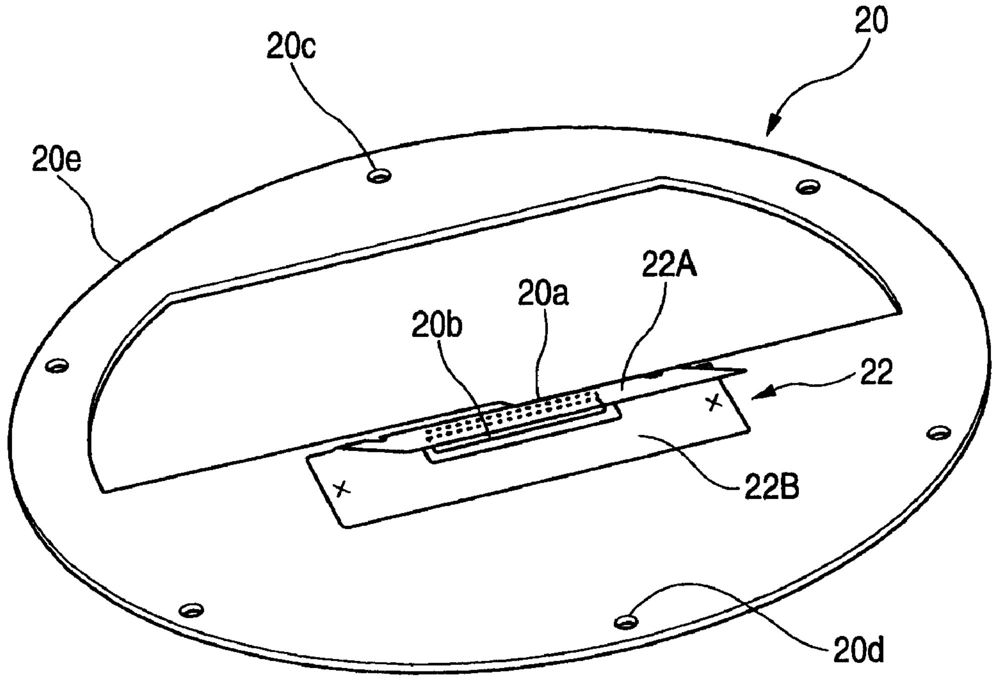
Prior Art FIG. 12
FIG. 12 is a perspective view showing a shade and a light shielding plate shown in FIG. 11.

According to such a configuration, as shown in FIG. 10, when the position of the auxiliary light shielding portion 148 on the shade 143 is adequately selected, the adjusted irradiation zone Px where the illuminance is partly lowered can be formed in a specific region of the light distribution pattern Pohs for overhead sign illumination.

Namely, in the same manner as the case where the auxiliary light shielding portion is disposed in the front end portion of the light-dark boundary forming plate 41, a partial change of the light distribution pattern Pohs for overhead sign illumination can be easily made so as to flexibly correspond with various regulations in which different restrictions are imposed on partial illuminance. Further, in order to prevent glare to a driver of an oncoming vehicle from occurring, fine adjustment can be performed for each type of vehicle.

Further, compared with the case where the auxiliary light shielding portion is formed by a separate member, the production cost can be lowered since the auxiliary light shielding portion 148 is provided integrally on the light transmitting portion 143*b* of the shade 143.

While description has been made in connection with exemplary embodiments of the present invention it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A vehicle headlamp comprising:

a projection lens which is placed on an optical axis extending in a front and rear direction of a vehicle;

a light source which is placed behind a rear focal point of the projection lens;

a reflector which reflects light emanated directly from the light source in a forward direction and toward the optical axis; and a light-dark boundary forming plate which is placed between the projection lens and the light source, wherein the light-dark boundary forming plate extends rearward and obliquely downward from a vicinity of the rear focal point of the projection lens, a light-dark boundary forming portion is formed on a front end portion of the light-dark boundary forming plate, the light-dark boundary forming portion shields a part of the light reflected from the reflector and forms a cut-off line of a light distribution pattern;

a shade which shields a part of the light reflected from the reflector and eliminates upwardly projected light, wherein the shade is disposed perpendicular to the optical axis, a light transmitting portion is formed in a vicinity of an upper edge of the shade, an opening is formed by the light transmitting portion and the front end portion of the light-dark boundary forming plate, and light transmitting though the opening forms an overhead sign pattern which illuminates above an upper portion of the cut-off line.

2. The vehicle headlamp according to claim 1, wherein the light-dark boundary forming portion is defined by a sectional shape of the front end portion of the light-dark boundary forming plate.

3. The vehicle headlamp according to claim 1, further comprising an auxiliary light shielding portion which shields a part of the upwardly projected light that passes below the light-dark boundary forming plate so as to adjust the light distribution pattern, wherein the auxiliary light shielding portion is disposed in a vicinity of the front end portion of the light-dark boundary forming plate.

4. The vehicle headlamp according to claim 1, further comprising an auxiliary light shielding portion which shields a part of the light transmitting through the opening so as to adjust the light distribution pattern, wherein the auxiliary light shielding portion is disposed on the light transmitting portion.

5. The vehicle headlamp according to claim 1, wherein the front end portion of the light-dark boundary forming plate is press-molded.

6. The vehicle headlamp according to claim 1, further comprising a lamp body and a cover, wherein the projection lens, the light source and the reflector are housed within a lamp chamber formed by the lamp body and the cover.

7. The vehicle headlamp according to claim 1, wherein a reinforcing rib is formed on the light-dark boundary forming plate.

8. The vehicle headlamp according to claim 1, wherein the light-dark boundary forming portion includes a level difference on left and right sides of the front end portion of the light-dark boundary forming plate.

9. The vehicle headlamp according to claim 2, wherein the light-dark boundary forming portion includes a level difference on left and right sides of the front end portion of the light-dark boundary forming plate.

10. The vehicle headlamp according to claim 1, wherein the light-dark boundary forming portion includes a level difference on left and right sides of the front end portion of the light-dark boundary forming plate.

* * * * *